United States Patent
Kruglick (10) Patent No.: US 8,254,250 B2
(45) Date of Patent: Aug. 28, 2012

(54) DETERMINING OPTIMUM DELIVERY CONDITIONS ASSOCIATED WITH A RESTORATION PLAN IN A COMMUNICATION NETWORK

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 12/895,666

(22) Filed: Sep. 30, 2010

(65) Prior Publication Data

US 2012/0082027 A1    Apr. 5, 2012

(51) Int. Cl.
*H04L 12/26* (2006.01)
(52) U.S. Cl. .................................. 370/225; 370/352
(58) Field of Classification Search .................. 370/216, 370/217, 221, 236, 290, 225, 352; 714/4.3, 714/13
See application file for complete search history.

(56) References Cited

U.S. PATENT DOCUMENTS

| | | | |
|---|---|---|---|
| 5,862,125 A | 1/1999 | Russ | |
| 6,134,671 A * | 10/2000 | Commerford et al. | 714/4.3 |
| 6,327,669 B1 * | 12/2001 | Croslin | 714/4.1 |
| 7,330,440 B1 | 2/2008 | Bryant et al. | |
| 7,571,353 B2 | 8/2009 | Largman | |
| 2003/0169692 A1 | 9/2003 | Stern et al. | |
| 2007/0153674 A1 | 7/2007 | Alicherry et al. | |
| 2007/0153676 A1 | 7/2007 | Baglin et al. | |
| 2011/0141877 A1 * | 6/2011 | Xu et al. | 370/216 |

OTHER PUBLICATIONS

Srinivas, Sampath, A polynomial algorithm for computing the optimal repair strategy in a system with independent component failures, Proceedings of the Eleventh Annual Conference on Uncertainty in Artificial Intelligence, Montreal Quebec, Canada, Aug. 18-20, 1995.
Fox, Armando and David Patterson, Self-Repairing Computers, Scientific American, Jun. 2003, 288(6), pp. 54-61.
Choi, Changyeol and Sunsoo Kim, A dependability management mechanism for ubiquitous computing systems, Lecture Notes on Computer Science, 2004, 3823(2005), pp. 1293-1302, Japan.
Australian Patent Office, International Search Report and Written Opinion of the International Searching Authority for PCT/US2011/023039, May 6, 2011, Australia.
Corke, P., et al., "Autonomous Deployment and Repair of a Sensor Network using an Unmanned Aerial Vehicle," International Conference on Robotics & Automation, Proceedings of the 2004 IEEE, Apr. 26-May 1, 2004, vol. 4, pp. 3602-3608.
Ghosh, D., et al., "Self-healing systems—survey and synthesis," Decision support systems, 2007, vol. 42, No. 4, pp. 2164-2185.
Mauve, M., et al., "A Survey on Position-Based Routing in Mobile Ad Hoc Networks," IEEE Network, Nov./Dec. 2001, vol. 15, No. 6, pp. 30-39.

* cited by examiner

*Primary Examiner* — Raj Jain
*Assistant Examiner* — Emmanuel Maglo (57) ABSTRACT

Technologies for determining optimum delivery conditions associated with a restoration plan that addresses potentially troubled nodes are generally disclosed.

21 Claims, 5 Drawing Sheets

400 A computer program product.

402 A signal bearing medium.

404 Machine-readable instructions, which, if executed by one or more processors, operatively enable a computing device to:

receiving, via the one or more control nodes, operational information of a plurality of nodes of the communication network, the operational information including information regarding an indication of potentially troubled nodes;

determining, via the one or more control nodes, a restoration plan based at least in part on the received indication of potentially troubled nodes, wherein the restoration plan is associated with one or more repair data packages;

determining, via the one or more control nodes, optimum delivery conditions associated with the restoration plan; and/or providing, via the one or more control nodes, at least one of the one or more repair data packages to a select non-troubled node adjacent to a select potentially troubled node prior to failure of the select potentially troubled node, wherein the providing at least one of the one or more repair data packages is based at least in part on the determined optimum delivery conditions.

| 406 a computer-readable medium. | 408 a recordable medium. | 410 a communications medium. |

DETERMINING OPTIMUM DELIVERY CONDITIONS ASSOCIATED WITH A RESTORATION PLAN IN A COMMUNICATION NETWORK

BACKGROUND

In communication systems, self-healing systems may be utilized to repair failing or failed nodes. Self-healing systems have been utilized with sensor networks. Similarly, self-healing systems have been utilized with ad-hoc network formats that may include a network routing cost table. However, such self-healing systems may not have taken changing network conditions into consideration when being utilized to repair failing or failed nodes.

SUMMARY

In one embodiment for determining optimum delivery conditions associated with a restoration plan implemented in one or more control nodes of a communication network, the one or more control nodes may receive operational information of a multiple number of nodes of the communication network. The operational information may include information regarding an indication of potentially troubled nodes. The one or more control nodes may determine a restoration plan based at least in part on the received indication of potentially troubled nodes. The restoration plan may be associated with one or more repair data packages. The one or more control nodes may determine optimum delivery conditions associated with the restoration plan. The one or more control nodes may provide at least one of the one or more repair data packages to a select non-troubled node adjacent to a select potentially troubled node prior to failure of the select potentially troubled node. Such a providing of at least one of the one or more repair data packages may be based at least in part on the determined optimum delivery conditions.

In another embodiment for determining optimum delivery conditions associated with a restoration plan implemented in one or more control nodes of a communication network, the one or more control nodes may receive operational information of a multiple number of nodes of the communication network. The operational information may include information regarding an indication of potentially troubled nodes. The one or more control nodes may determine a restoration plan based at least in part on the received indication of potentially troubled nodes. The restoration plan may be associated with one or more repair data packages. The one or more control nodes may receive dynamic network condition data associated with the communication network. The one or more control nodes may determine optimum delivery conditions associated with the restoration plan based at least in part on the dynamic network condition data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following description sets forth various examples along with specific details to provide a thorough understanding of claimed subject matter. It will be understood by those skilled in the art that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, apparatus, systems and/or computer program products related to determining optimum delivery conditions associated with a restoration plan that addresses potentially troubled nodes.

Discussed below is the concept of using network routing costs in the design and implementation of repair strategies. In some examples, the effects of possibly frequent repair deployment on fixed bandwidth communication networks have been considered. For example, reduced communication network stress and faster repairs may be sought based at least in part on a consideration of the speed and resource demands that may be associated with a restoration plan designed for self repair of potentially troubled nodes in the communication network. Some strategies discussed herein may consider the dynamic and/or static communication network limits in developing and/or optimizing such restoration plans so that self-healing happens quickly and with reduced impact to other processes.

As used herein the term "communication network" may refer to any number of communication systems including a multiple number of nodes adapted for communication with one another. For example, such a communication network may be a fixed bandwidth wireless ubicomp-type network that is capable of functioning without dedicated infrastructure (e.g., a Zigbee-type communication network, or the like), although other examples of communication networks are contemplated. For example, such a communication network may not have a fixed bandwidth, may not be wireless (e.g., a power-line network or a wired network), may include dedicated infrastructure, and/or may not be an ubicomp-type network. As used herein the term "ubicomp-type network" may refer to any number of communication systems including a mesh-type network, an ad hoc-type network, the like and/or combinations thereof that may include a multiple number of small and/or inexpensive nodes, which may be distributed at a number of varying scales throughout everyday life.

In one example, a communication network may have several potentially troubled nodes (e.g., nodes that have failed or may be about to fail or are likely to fail) and a restoration plan. As used herein the term "restoration plan" may include an inspection plan (e.g., one or more inspection steps) and/or a repair plan (e.g., loading repair data packages, such as memory repair images, onto nodes). In some examples, optimum delivery conditions associated with the restoration plan may be based at least in part on a network cost of different ways of performing such inspections and/or different ways of delivering the repair data packages to minimize the disruption to ongoing functions within the communication network.

In some examples, the repair data packages may be pre-loaded proximate to potentially troubled nodes that may be expected to fail shortly. Additionally or alternatively repairs to a particular potentially troubled node may be deprioritized in cases where an application (e.g., a user application or process, a system application or process, or the like) associated with the particular potentially troubled node is redundantly supported by a second node and/or in cases where a buffer may sustain the application for a short time to allow slower repair delivery.

Figure 1:
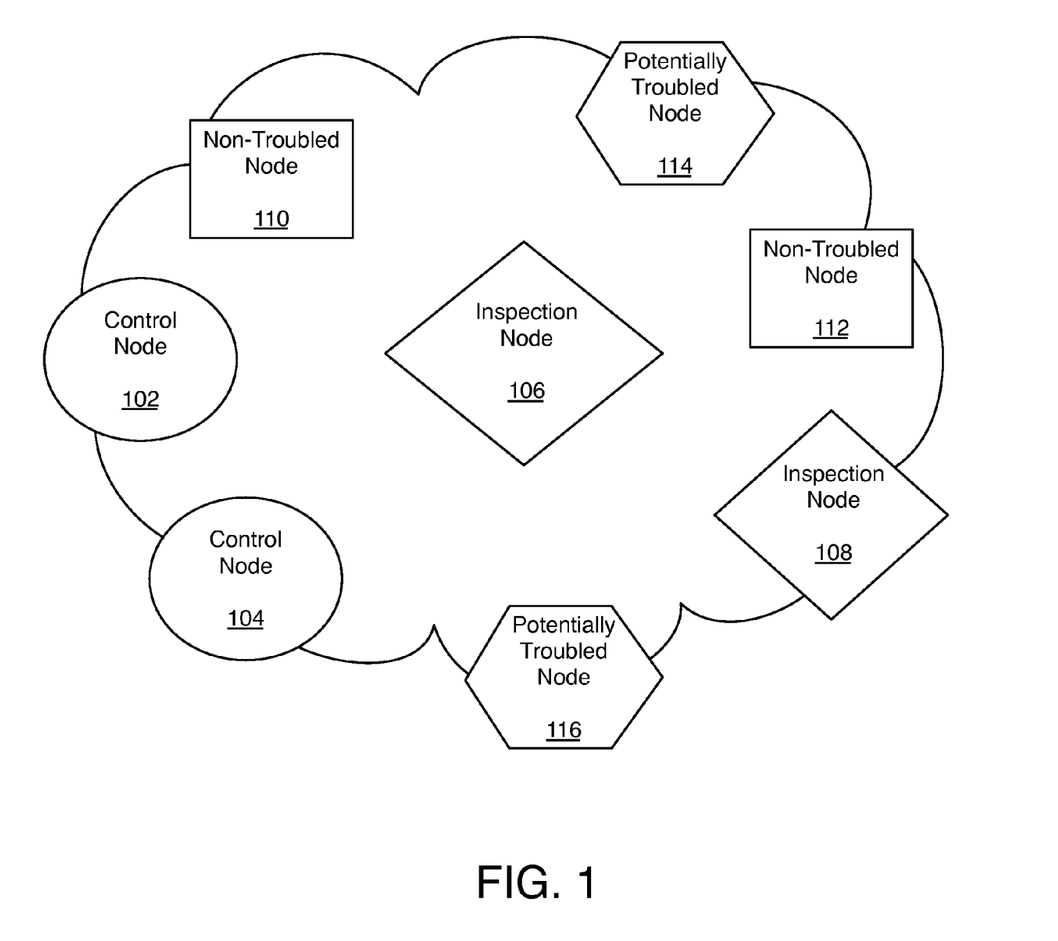
FIG. 1 illustrates a diagram of an example communication network that is arranged in accordance with at least some embodiments of the present disclosure.

FIG. 1 illustrates a diagram of an example communication network 100 that is arranged in accordance with at least some embodiments of the present disclosure. Communication network 100 may include a multiple number of nodes, such as nodes 102, 104, 106, 108, 110, 112, 114, and 116 arranged in communication with one another. Individual nodes 102, 104, 106, 108, 110, 112, 114, and 116 may be arranged (e.g., coupled) in communication with one another. For example, individual nodes 102, 104, 106, 108, 110, 112, 114, and 116 may be arranged (e.g., coupled) in communication with one another in one-on-one direct communication and/or in indirect communication through one or more infrastructure devices (not shown) and/or relaying through one or more of individual nodes 102, 104, 106, 108, 110, 112, 114, and 116. Individual nodes 102, 104, 106, 108, 110, 112, 114, and 116 may include portable (or mobile) electronic device such as a sensor (e.g., a Zigbee-type device), a cell phone, a personal data assistant (PDA), a personal media player device, a wireless web-watch device, a personal headset device, an application specific device, and/or the like, and/or combinations thereof. As will be described in greater detail below, each of individual nodes 102, 104, 106, 108, 110, 112, 114, and 116 may be designated as a control node (as illustrated by control nodes 102 and 104) or an inspection node (as illustrated by inspection nodes 106 and 108), and may be determined to be either a non-troubled node (as illustrated by non-troubled nodes 110 and 112) or a potentially troubled node (as illustrated by potentially troubled nodes 114 and 116).

In some examples, one or more control nodes 102 and/or 104 may be utilized to implement self-healing strategies that may include a restoration plan. Such self-healing strategies may be implemented on a single control node (e.g., either control node 102 or 104), or distributed in any number of modules for implementation on a multiple number of control nodes (e.g., control nodes 102 and 104). As described above such a restoration plan may include an inspection plan (e.g., one or more inspection steps) and/or a repair plan (e.g., loading repair data packages, such as memory repair images, onto nodes). For example, control nodes 102 and/or 104 may designate one or more of individual nodes 102, 104, 106, 108, 110, 112, 114, and 116 as inspection nodes 106 and/or 108 to monitor communication network 100 based at least in part on such an inspection plan component of a restoration plan.

In some examples, inspection nodes 106 and/or 108 may be configured to monitor communication network 100 to determine operational information associated with communication network 100, including information regarding an indication of potentially troubled nodes 114 and/or 116. Inspection nodes 106 and/or 108 may be configured to communicate such operational information to control nodes 102 and/or 104.

Likewise, in some examples, control nodes 102 and/or 104 may determine a repair plan component of a restoration plan, which may be associated with one or more repair data packages. For example, control nodes 102 and/or 104 may determine such a repair plan based at least in part on the operational information communicated from inspection nodes 106 and/or 108. In such a case, control nodes 102 and/or 104 may be configured to differentiate between non-troubled nodes 110 and 112 and potentially troubled nodes 114 and 116.

The algorithms for determining what to inspect for detection of failed elements has been solved for many general cases, as have algorithms for determining what nodes need to be repaired to restore functionality. For example, such inspection may include details within each node. Some exemplary methods may include watching free memory (and the rate of change of same), buffers, cache calls, etc. These algorithms for deriving the individual elements of a restoration plan related to determining what nodes to inspect and/or repair (e.g., a restoration plan that may include an inspection plan component and/or a repair plan component) will not be described in further detail herein. Some examples of such algorithms for deriving the individual elements of a restoration plan related to determining what nodes to inspect and/or repair include S. Srinivas, "A polynomial algorithm for computing the optimal repair strategy in a system with independent component failures," in Proceedings of the Eleventh Annual Conference on Uncertainty in Artificial Intelligence, San Francisco, Calif., 1995, 515-522; M. Mauve, A. Widmer, and H. Hartenstein, "A survey on position-based routing in mobile ad hoc networks," IEEE network 15, no. 6 (2001): 30-39; P. Corke et al., "Autonomous deployment and repair of a sensor network using an unmanned aerial vehicle," in 2004 IEEE International Conference on Robotics and Automation, 2004, Proceedings ICRA'04, vol. 4, 2004; D. Ghosh et al., "Self-healing systems-survey and synthesis," Decision support systems 42, no. 4 (2007): 2164-2185, for example.

Figure 2:
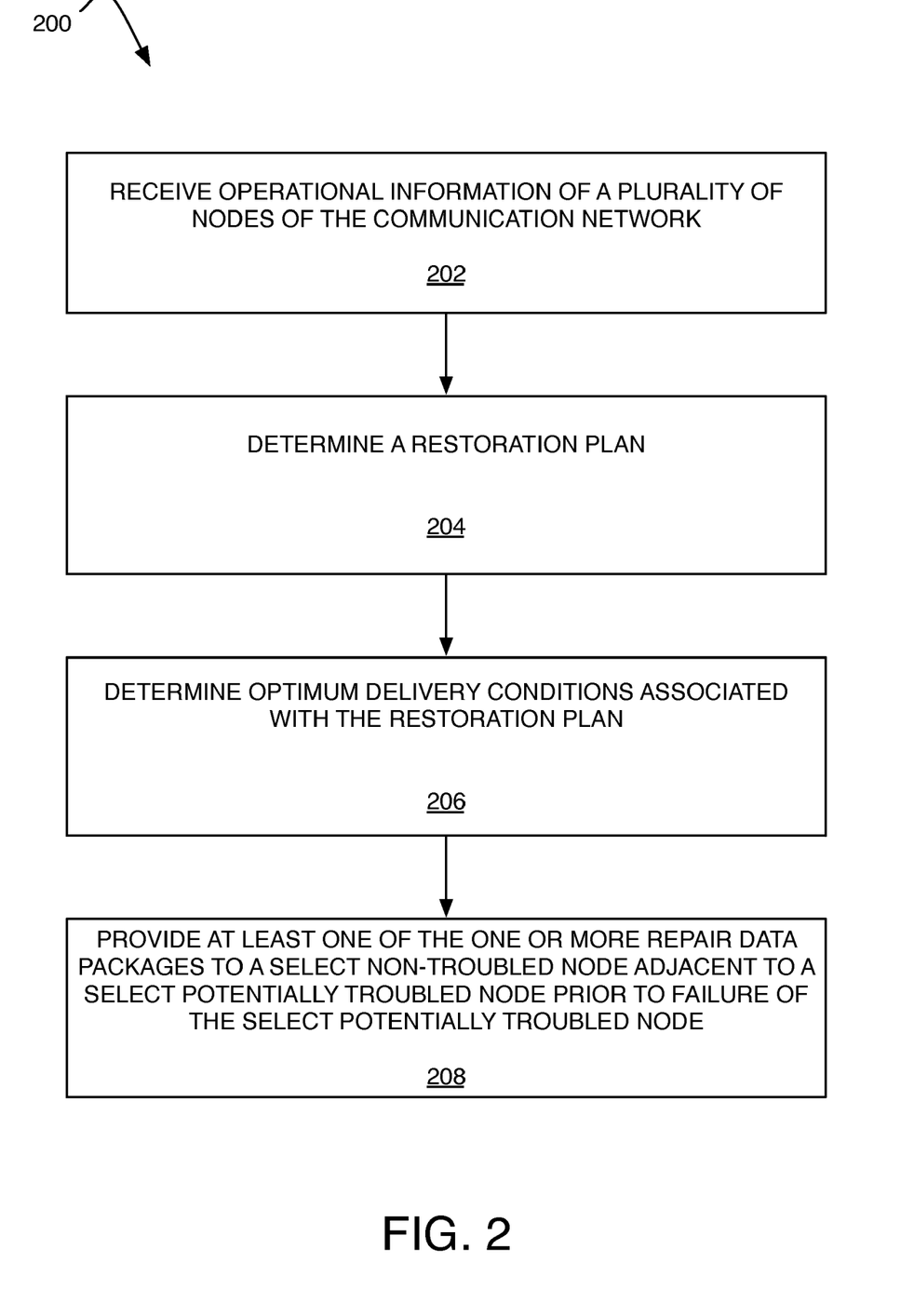
FIG. 2 illustrates an example process for determining optimum delivery conditions associated with the communication network that is arranged in accordance with at least some embodiments of the present disclosure.

FIG. 2 illustrates an example process for determining optimum delivery conditions associated with a communication network that is arranged in accordance with at least some embodiments of the present disclosure. Process 200, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 2 may be practiced in various implementations. For example, although process 200, as shown in FIG. 2, may comprise one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of functional operations as indicated by example operations 202, 204, 206, and/or 208.

As illustrated, process 200 may be implemented for determining optimum delivery conditions associated with communication network 100 (FIG. 1). Processing may begin at block 202, "receive operational information of a multiple number of nodes of the communication network", where operational information associated with a multiple number of nodes of the communication network may be received. For example, one or more control nodes of the communication network may receive operational information including information regarding an indication of potentially troubled nodes. Such potentially troubled nodes may be suspected of poor operation due to exogenic causes (e.g., virus, etc.) and/or endogenic causes (e.g., memory corruption, race conditions, invalid pointers or addresses, waiting for data that is not coming, etc.). In some examples, such operational information including information regarding an indication of potentially troubled nodes might be initially detected by one or more of the inspection nodes and then communicated to one or more of the control nodes. For example, such operational information may provide an indication of the relative health of each of the potentially troubled nodes (e.g., a probability of failure, an estimated time to failure, or the like).

Processing may continue from block 202 to block 204, "determine a restoration plan", where a restoration plan may be determined. As discussed above, such a restoration plan may include an inspection plan (e.g., one or more inspection steps) and/or a repair plan (e.g., loading repair data packages, such as memory repair images, onto nodes). For example, one or more control nodes of the communication network may differentiate between non-troubled nodes and potentially troubled nodes and determine such a restoration plan for the potentially troubled nodes based at least in part on the received indication of potentially troubled nodes. For example, more than one control nodes may be utilized (e.g., a first control node might notice and repair a memory issue while another control node may repair an invalid address table). In some examples, such a restoration plan may associate one or more repair data packages (e.g., memory repair images or the like) with potentially troubled nodes, where the repair data packages may be configured to repair potentially troubled nodes so that such nodes are capable of functioning properly. As noted above, algorithms for deriving the individual elements of a restoration plan related to determining what nodes to inspect and/or repair have been solved for many general cases (e.g., a restoration plan that may include an inspection plan component and/or a repair plan component) and will not be described in further detail herein.

Processing may continue from block 204 to block 206, "determine optimum delivery conditions associated with the restoration plan", where optimum delivery conditions associated with the restoration plan may be determined. For example, one or more control nodes of the communication network may determine optimum delivery conditions including but not limited to adjusting a priority ranking associated with the potentially troubled nodes to organize a sequence of providing of the one or more repair data packages. In such cases, two or more potentially troubled nodes may be associated with such a priority ranking based at least in part on the associated operational information, which may provide an indication of the relative health of each of the potentially troubled nodes. For example, such a priority ranking may have prioritized those potentially troubled nodes that are relatively the most troubled; however, only considering the health of the nodes may not provide optimum delivery conditions. Accordingly, the determined optimum delivery conditions may be utilized to adjust such a priority ranking associated with the potentially troubled nodes, as will be explained in examples discussed below in regards to FIG. 3.

Processing may continue from block 206 to block 208, "provide at least one of the one or more repair data packages to a select non-troubled node adjacent to a select potentially troubled node prior to failure of the select potentially troubled node", where repair data packages may be provided to a select non-troubled node adjacent to a select potentially troubled node prior to failure of the select potentially troubled node. For example, one or more control nodes of the communication network may provide at least one of the one or more repair data packages to the select non-troubled node prior to failure of the select potentially troubled node based at least in part on the determined optimum delivery conditions. As used herein the term "adjacent" may refer to a select non-troubled node being closer, in a network traffic sense, than a control node is to a select potentially troubled node, without necessarily requiring a physical adjacency and/or network hop adjacency. For example, such "adjacency" may be based at least in part on a criteria that considers spare resources for handling and delivering of repair data packages and/or a criteria that considers diversity (e.g., given multiple options may be advantageous to deliver a repair data package to a node of different type (e.g., OS-type, chipset-type, etc.) than the troubled one) in case nodes of similar types may be ready to fail too but may not have been detected yet.

The determination of which nodes are potentially troubled and the selection of repair data packages intended for these potentially troubled nodes is discussed above with respect to block 204. In operation, for example, a control node executing process 200 may detect probable failure a few seconds before the actual fault at several potentially trouble nodes needing repair. For example, a failure prediction algorithm may generate a probability of failure within a time window, where a rate of change of such a probability can be used to refine a time-to-failure estimate. A control node executing process 200 may recognize from network condition data (as is discussed in greater detail below with regard to FIG. 3) that delivering repair data packages at high priority at the time of failure may cause additional problems on communication network and instead may determine optimum delivery conditions to provide some or all of the repair data packages onto one or more non-troubled nodes (e.g., a healthy node) proximate to potentially trouble nodes needing repair so that when the repair is activated those potentially troubled nodes needing repair receive the repair data packages rapidly from the healthy, proximate, non-troubled nodes without stressing the communication network. This may permit relatively faster repair with a relatively lesser impact on other functions of the communication network.

Figure 3:
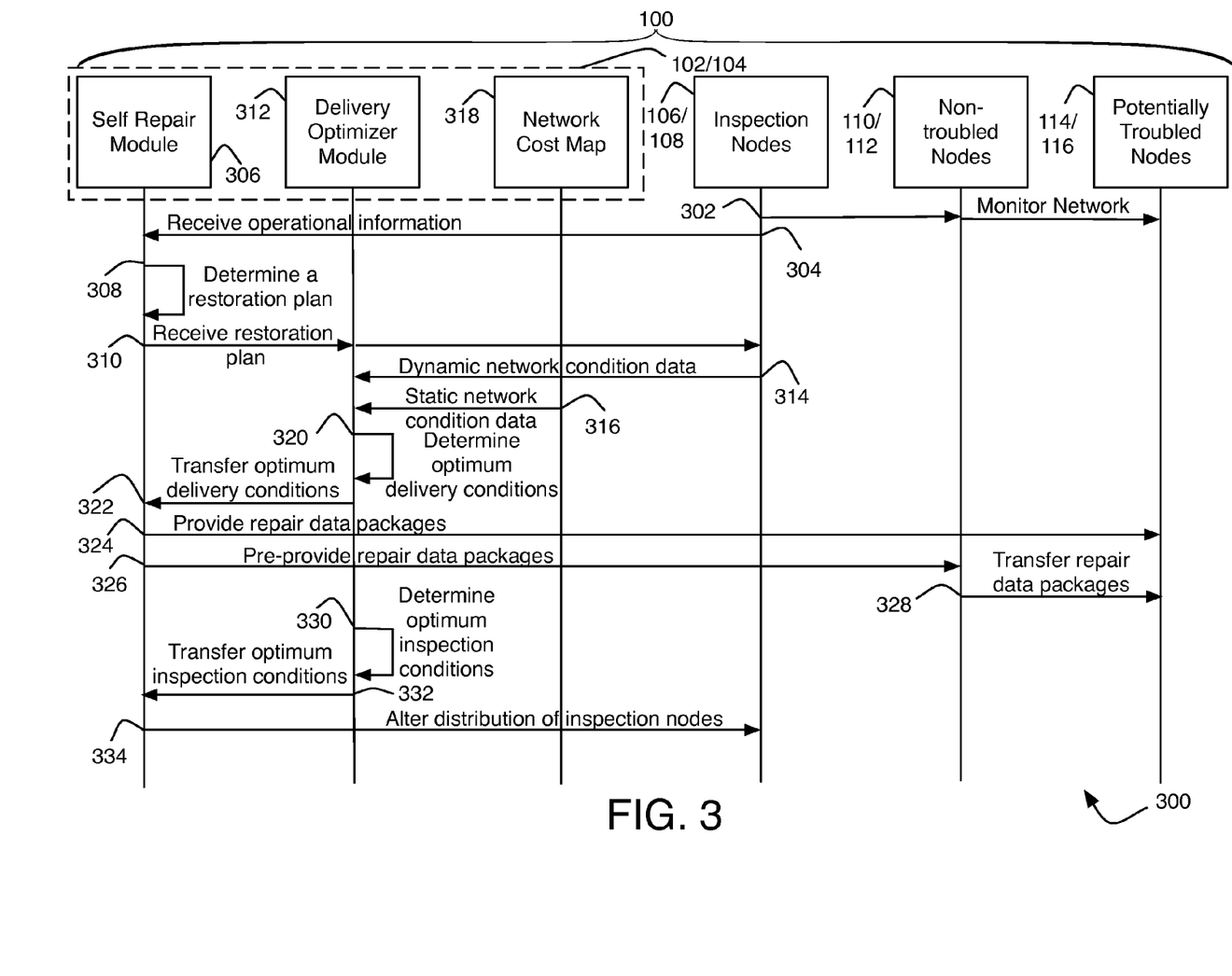
FIG. 3 illustrates another example process for determining optimum delivery conditions associated with the communication network that is arranged in accordance with at least some embodiments of the present disclosure.

FIG. 3 illustrates another example process for determining optimum delivery conditions associated with the communication network that is arranged in accordance with at least some embodiments of the present disclosure. Process 300 may include one or more of operations as illustrated by operations 302, 304, 308, 310, 314, 316, 320, 324, 326, 328, 330, 332, and/or 334.

Process 300 may provide one or more examples of implementations of process 200 of FIG. 2. As illustrated, process 300 may be implemented for determining optimum delivery conditions associated with communication network 100. Processing may begin at operation 302, "monitor network", where all or portions of communication network 100 may be monitored. For example, inspection nodes 106 and/or 108 may monitor all or portions of communication network 100, such as by monitoring the performance of individual nodes. In some examples, inspection nodes 106 and/or 108 may monitor non-troubled nodes 110 and/or 112, potentially troubled nodes 114 and/or 116, or other nodes of communication network 100. Such monitoring may gather operational information including information regarding an indication of potentially troubled nodes.

Processing may continue from operation 302 to operation 304 "receive operational information", where operational information associated with a multiple number of nodes (e.g., potentially troubled nodes 114 and/or 116) of communication network 100 may be received. For example, one or more control nodes 102 and/or 104 of communication network 100 may receive operational information including information regarding an indication of potentially troubled nodes. Such potentially troubled nodes 114 and/or 116 may be suspected of poor operation due to exogenic causes (e.g., virus, etc.) and/or endogenic causes (e.g., waiting for data that is not coming, etc.). In some examples, such operational information (e.g., information regarding an indication of potentially troubled nodes) might be initially detected by one or more of inspection nodes 106 and/or 108 and then communicated to one or more of control nodes 102 and/or 104.

In the illustrated example, such operational information may be communicated to a self repair module 306 associated with one or more of control nodes 102 and/or 104. Self repair module 306 may be implemented on a single one of control nodes 102 and/or 104, or distributed in any number of modules for implementation on a multiple number of control nodes 102 and/or 104. In some examples, self repair module 306 associated with one or more control nodes 102 and/or 104 may be utilized to implement self-healing strategies that may include a restoration plan.

Processing may continue from operation 304 to operation 308, "determine a restoration plan", where a restoration plan may be determined. For example, self repair module 306 associated with one or more control nodes 102 and/or 104 may determine such a restoration plan based at least in part on the received indication of potentially troubled nodes. As described above such a restoration plan may include an inspection plan (e.g., one or more inspection steps) and/or a repair plan (e.g., loading repair data packages, such as memory repair images, onto nodes).

For example, self repair module 306 associated with control nodes 102 and/or 104 may designate one or more of individual nodes 102, 104, 106, 108, 110, 112, 114, and 116 as inspection nodes 106 and/or 108 to monitor communication network 100 based at least in part on such an inspection plan component of a restoration plan.

Likewise, in some examples, self repair module 306 associated with control nodes 102 and/or 104 may determine a repair plan component of a restoration plan, which may be associated with one or more repair data packages. In some examples, such repair data packages may include memory repair images or the like, which may be configured to repair potentially troubled nodes so that such nodes are capable of functioning properly. For example, control nodes 102 and/or 104 may determine a repair plan based at least in part on the operational information communicated from inspection nodes 106 and/or 108. In such a case, control nodes 102 and/or 104 may be configured to differentiate between non-troubled nodes 110 and 112 and potentially troubled nodes 114 and 116.

Processing may continue from operation 308 to operation 310, "receive restoration plan", where the restoration plan may be transferred from self repair module 306 to a delivery optimizer module 312. For example, delivery optimizer module 312 may be associated with one or more of control nodes 102 and/or 104 to receive the restoration plan from self repair module 306. Additionally or alternatively, all or portions of the operational information may be included or associated with the restoration plan received by delivery optimizer module 312. Delivery optimizer module 312 may be implemented on a single one of control nodes 102 and/or 104, or distributed in any number of modules for implementation on a multiple number of control nodes 102 and/or 104. Additionally or alternatively, although delivery optimizer module 312 and self repair module 306 are illustrated as separate modules, the various operations of delivery optimizer module 312 and self repair module 306 may instead be combined and/or reorganized in one or more modules.

Additionally or alternatively, operation 310, "receive restoration plan", may include a transfer of all or portions an inspection plan portion of the restoration plan from self repair module 306 to inspection nodes 106 and/or 108. As discussed above, the restoration plan discussed at operation 310 may include an inspection plan. The inspection plan portion of the restoration plan may have been provided based at least in part on the received indication of potentially troubled nodes. Such an inspection plan may include a selection of at least a portion of the non-troubled nodes 110 and/or 112 as inspection nodes 106 and/or 108 intended to probe at least a portion of the potentially troubled nodes 114 and/or 118. As will be discussed in more detail below, with respect to operations 330-334, the inspection plan portion of the restoration plan may be altered based on determined optimum inspection conditions.

Processing may continue from operation 310 to operation 314, "dynamic network condition data", where dynamic network condition data associated with the communication network 100 may be received by delivery optimizer module 312. For example, dynamic network condition data may be received from inspection nodes 106 and/or 108 by delivery optimizer module 312. Additionally or alternatively, such dynamic network condition data may be received directly from any of nodes 102, 104, 106, 108, 110, 112, 114, and/or 116 without being first gathered by inspection nodes 106 and/or 108. As used herein the term "dynamic network condition data" may include observed data related to changing network conditions such as demand, congestion, the like, and/or combinations thereof. For example, such dynamic network condition data may be based at least in part on observed hop counts associated with a routing table, observed map delay times, observed congestion conditions from existing traffic, the like, or combinations thereof. Additionally or alternatively, as will be discussed in more detail below with respect to operation 320, such dynamic network condition data may include data regarding a redundant support of applications among more than one node and/or data regarding a buffer status supporting such applications.

Additionally, processing may continue from operation 310 to operation 316, "static network condition data", where static network condition data associated with the communication network 100 may be received by delivery optimizer module 312. For example, static network condition data may be received from a network cost map 318 (or other repository of non-dynamic conditions associated with communication network 100) by delivery optimizer module 312. As used herein the term "static network condition data" may include pre-determined data related to non-dynamic network conditions. For example, such static network condition data may be based at least in part on a bandwidth capacity-type network cost map or the like.

Processing may continue from operation 316 to operation 320, "determine optimum delivery conditions", where optimum delivery conditions associated with the restoration plan may be determined. As illustrated, operation 320 is illustrated as occurring after the sequential occurrence of operation 302, operation 304, operation 310, operation 314, and operation 316; however, operations 302, 304, 310, 314, and/or 316 may occur in some other order. For example, the restoration plan may include requests for further testing or specific monitoring actions (e.g., monitoring via inspection nodes 106 and/or 108). In such an example, the restoration plan might involve first calling for more test data to confirm a hypothesis, for example.

In one example, delivery optimizer module 312 may determine optimum delivery conditions including but not limited to adjusting a priority ranking associated with the potentially troubled nodes 114 and/or 116 to organize a sequence of providing of the one or more repair data packages based at least in part on the dynamic network condition data and/or on the static network condition data. For example, such a priority ranking may have prioritized those potentially troubled nodes 114 and/or 116 that are relatively the most troubled; however, only considering the health of the nodes may not provide optimum delivery conditions. Accordingly, the determined optimum delivery conditions may be utilized to adjust such a priority ranking associated with the potentially troubled nodes 114 and/or 116, based at least in part on the dynamic network condition data and/or on the static network condition data.

In some embodiments, the dynamic network condition data may include data regarding a first node (e.g., any of nodes 102, 104, 106, 108, 110, 112, 114, and/or 116) supporting an application and a second node (e.g., any other of nodes 102, 104, 106, 108, 110, 112, 114, and/or 116) redundantly supporting the application. In such a case the determination of optimum delivery conditions associated with the restoration plan may includes adjusting a priority ranking associated with the potentially troubled nodes based at least in part on the second node redundantly supporting the application.

Additionally or alternatively, in some embodiments, the dynamic network condition data may include data regarding a buffer status associated with a first node (e.g., any of nodes 102, 104, 106, 108, 110, 112, 114, and/or 116) supporting an application; and wherein the determination of optimum delivery conditions associated with the restoration plan includes adjusting a priority ranking associated with the potentially troubled nodes based at least in part on the buffer status associated with the first node supporting the application.

Processing may continue from operation 320 to operation 322, "transfer optimum delivery conditions", where optimum delivery conditions associated with the restoration plan may be transferred from delivery optimizer module 312 to self repair module 306. Processing may continue from operation 322 to operation 324, "provide repair data packages", where one or more repair data packages may be provided to a select troubled node 114 and/or 116. For example, one or more control nodes 102 and/or 104 may provide at least one of the one or more repair data packages to the select potentially troubled node 114 and/or 116 based at least in part on the determined optimum delivery conditions.

Additionally or alternatively, with respect to operation 324, process 300 may proceed to operation 326, "pre-provide repair data packages", where repair data packages may be provided to a select non-troubled node 110 and/or 112 adjacent to a select potentially troubled node 114 and/or 116 prior to failure of the select potentially troubled node 114 and/or 116. Processing may continue from operation 326 to operation 328, "transfer repair data packages", where select non-troubled node 110 and/or 112 may transfer repair data packages that have been pre-provided to the select potentially troubled node 114 and/or 116. For example, one or more control nodes 102 and/or 104 may provide at least one of the one or more repair data packages to the select non-troubled node 110 and/or 112 prior to failure of the select potentially troubled node 114 and/or 116 based at least in part on the determined optimum delivery conditions. In some examples, the transfer to the select potentially troubled node 114 and/or 116 may be triggered by a failure or increased probability of a failure in the select potentially troubled node 114 and/or 116. For example, process 300 may prepare and disburse repair data packages near any node with a given probability of failure (e.g., an eighty percent chance of failure, even a ten percent chance of failure, or even a one percent chance of failure) and then only trigger the transfer of the repair data packages to the select potentially troubled node 114 and/or 116 when failure happens or when failure is more certain (e.g., a ninety percent chance of failure). In some instance, such pre-provided repair data packages may be discarded without using them, but the gains to communication network 100 may be a net gain in that repairs that may be needed may have been pre-provided using low-impact traffic speeds.

In operation, for example, communication network 100 may have detected probable failure a few seconds before the actual fault at several potentially trouble nodes 114 and/or 116 needing repair. Delivery optimizer module 312 may recognize from the dynamic network condition data 314 and/or static network condition data 316 that delivering repair data packages at high priority at the time of failure may cause additional problems on communication network 100 and instead delivery optimizer module 312 may determine optimum delivery conditions 320 to provide some or all of the repair data packages onto one or more non-troubled nodes 110 and/or 112 (e.g., a healthy node) proximate to potentially trouble nodes 114 and/or 116 needing repair so that when the repair is activated those potentially trouble nodes 114 and/or 116 needing repair receive the repair data packages rapidly from the healthy, proximate, non-troubled nodes 110 and/or 112 without stressing communication network 100. This may permit relatively faster repair with a relatively lesser impact on other functions of communication network 100.

In addition or in the alternative to operations 320-328, process 300 may proceed to operation 330, "determine optimum inspection conditions", where optimum inspection conditions associated with an inspection plan portion of the restoration plan may be determined. As discussed above, the restoration plan discussed at operation 310 may include an inspection plan. The inspection plan portion of the restoration plan may have been provided based at least in part on the received indication of potentially troubled nodes. Such an inspection plan may include a selection of at least a portion of the non-troubled nodes 110 and/or 112 as inspection nodes 106 and/or 108 intended to probe at least a portion of the potentially troubled nodes 114 and/or 118. As discussed above with respect to operation 310, a transfer of all or portions the inspection plan portion of the restoration plan may be made to inspection nodes 106 and/or 108. Accordingly, while operations 330-334 are illustrated as occurring after operations 320-328, operations 330-334 may occur simultaneously or prior to operations 320-328 (e.g., operations 330-334 may be substituted for the transfer of all or portions the inspection plan to inspection nodes 106 and/or 108 associated with operation 310).

In the illustrated example, optimum inspection conditions associated with an inspection plan portion of the restoration plan may be determined based at least in part on the dynamic network condition data and/or on the static network condition data. For example, a selection of at least a portion of the non-troubled nodes 110 and/or 112 as inspection nodes 106 and/or 108 intended to probe at least a portion of the potentially troubled nodes 114 and/or 118 may be based at least in part on the dynamic network condition data (e.g., observed hop counts associated with a routing table, observed map delay times, observed congestion conditions from existing traffic, the like, or combinations thereof).

Processing may continue from operation 330 to operation 332, "transfer optimum inspection conditions", where optimum inspection conditions associated with the restoration plan may be transferred from delivery optimizer module 312 to self repair module 306. Processing may continue from operation 332 to operation 334, "alter distribution of inspection nodes", where the distribution of inspection nodes 106 and/or 108 may be altered among nodes (e.g., any of nodes 102, 104, 106, 108, 110, 112, 114, and/or 116) of communication network 100. Inspection nodes 106 and/or 108, as altered, may proceed to perform monitoring operations (as described above with respect to operation 302). For example, inspection nodes 106 and/or 108, as altered, may proceed to perform monitoring operations based at least in part on the determined optimum inspection conditions associated with the inspection plan component of the restoration plan. For example, additional variables may be watched via inspection nodes 106 and/or 108 to facilitate better recognition of previously observed failure modes.

Figure 4:
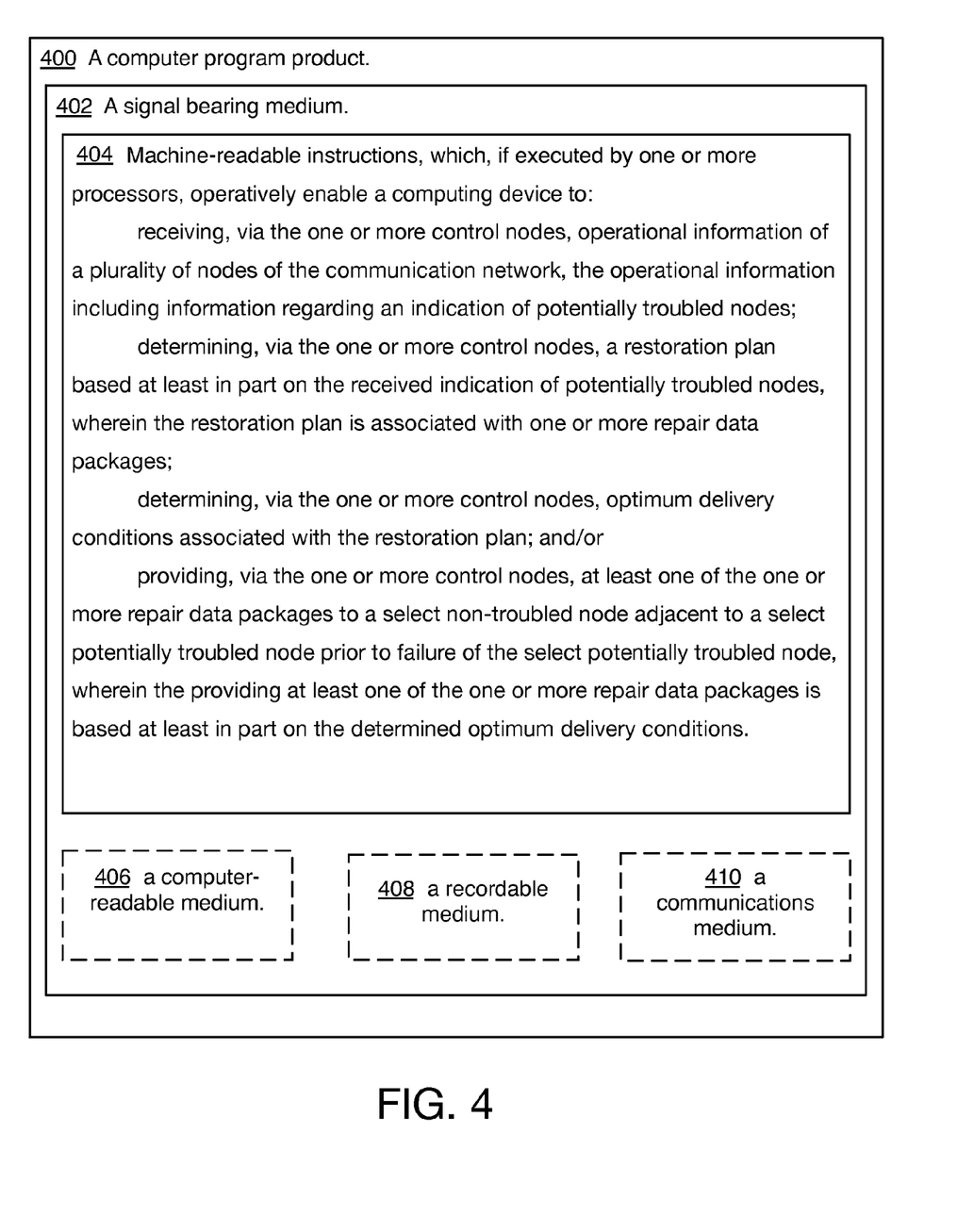
FIG. 4 is an illustration of an example computer program product that is arranged in accordance with at least some embodiments of the present disclosure.

FIG. 4 illustrates an example computer program product 400 that is arranged in accordance with at least some examples of the present disclosure. Program product 400 may include a signal bearing medium 402. Signal bearing medium 402 may include one or more machine-readable instructions 404, which, if executed by one or more processors, may operatively enable a computing device to provide the functionality described above with respect to FIG. 2 and/or FIG. 3. Thus, for example, referring to the system of FIG. 1 one or more of control nodes 102 and/or 104 may undertake one or more of the actions shown in FIG. 2 and/or FIG. 3 in response to instructions 404 conveyed by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.).

Figure 5:
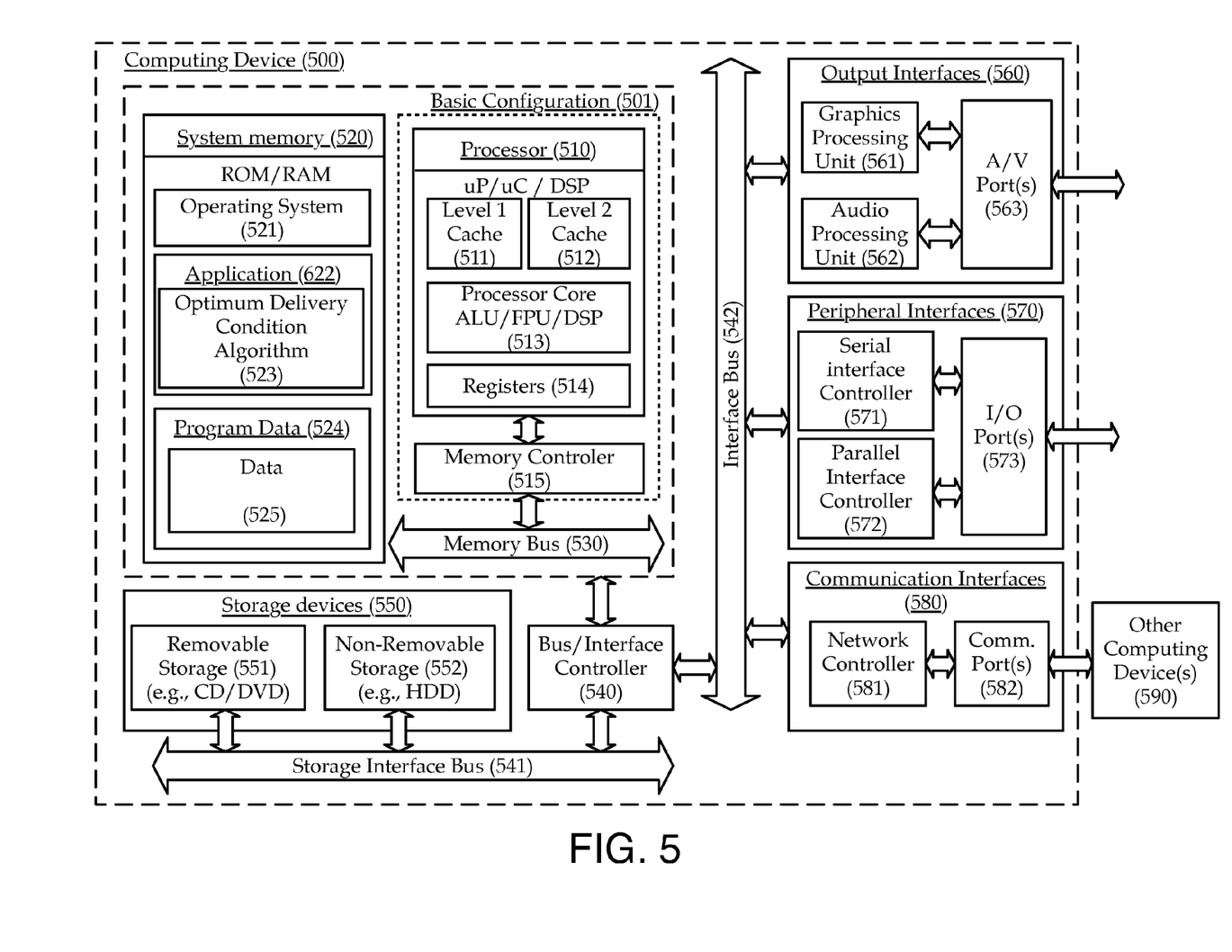
FIG. 5 is a block diagram of an illustrative embodiment of a computing device arranged in accordance with at least some embodiments of the present disclosure.

FIG. 5 is a block diagram illustrating an example computing device 500 that is arranged in accordance with at least some embodiments of the present disclosure. In one example configuration 501, computing device 500 may include one or more processors 510 and system memory 520. A memory bus 530 may be used for communicating between the processor 510 and the system memory 520.

Depending on the desired configuration, processor 510 may be of any type including but not limited to a microprocessor ($\mu$P), a microcontroller ($\mu$C), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include an optimum delivery condition algorithm 523 in a communication network that is arranged to perform the functions as described herein including the functional blocks and/or actions described with respect to process 200 of FIG. 2 and/or process 300 of FIG. 3. Program Data 524 may include data 525 for use with optimum delivery condition algorithm 523, for example, data corresponding to static network conditions or the like. In some example embodiments, application 522 may be arranged to operate with program data 524 on an operating system 521 such that implementations of determining optimum delivery conditions may be provided as described herein. For example, control nodes 102 and/or 104 may comprise all or a portion of computing device 500 and be capable of performing all or a portion of application 522 such that implementations of determining optimum delivery conditions may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 560 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method implemented in one or more control nodes of a communication network, comprising:

receiving, via the one or more control nodes, operational information of a plurality of nodes of the communication network, the operational information including information regarding an indication of troubled nodes, wherein the troubled nodes include nodes of the communication network which have a likelihood of failure but have not yet failed;

determining, via the one or more control nodes, a restoration plan based at least in part on the received indication of troubled nodes, wherein the restoration plan is associated with one or more repair data packages and the restoration plan is capable of execution by the troubled nodes to repair the troubled nodes;

determining, via the one or more control nodes, optimum delivery conditions associated with the restoration plan; and providing, via the one or more control nodes, at least one of the one or more repair data packages to a select non-troubled node adjacent to a select troubled node prior to failure of the select troubled node, wherein the providing at least one of the one or more repair data packages is based at least in part on the determined optimum delivery conditions.

2. The method of claim 1, wherein the determination of optimum delivery conditions associated with the restoration plan includes adjusting a priority ranking associated with the troubled nodes to organize a sequence of providing of the one or more repair data packages.

3. The method of claim 1, further comprising:
receiving dynamic network condition data associated with the communication network, and
wherein the determination of optimum delivery conditions associated with the restoration plan is based at least in part on the dynamic network condition data.

4. The method of claim 3, wherein the dynamic network condition data is based at least in part on one or more of observed hop counts associated with a routing table, observed map delay times, or observed congestion conditions from existing traffic.

5. The method of claim 4, further comprising:
receiving static network condition data associated with the communication network, wherein the static network condition data is based at least in part on a network cost map, and
wherein the determination of optimum delivery conditions associated with the restoration plan is based at least in part on the dynamic network condition data and the static network condition data.

6. The method of claim 3, wherein the dynamic network condition data includes dynamic network condition data regarding a first node supporting an application and a second node redundantly supporting the application; and wherein the determination of optimum delivery conditions associated with the restoration plan includes adjusting a priority ranking associated with the troubled nodes based at least in part on the second node redundantly supporting the application.

7. The method of claim 3, wherein the dynamic network condition data includes dynamic network condition data regarding a buffer status associated with a first node supporting an application; and wherein the determination of optimum delivery conditions associated with the restoration plan includes adjusting a priority ranking associated with the troubled nodes based at least in part on the buffer status associated with the first node supporting the application.

8. The method of claim 3, further comprising:
providing an inspection plan based at least in part on the received indication of troubled nodes, wherein the inspection plan includes a selection of at least a portion of the non-troubled nodes as inspection nodes intended to probe at least a portion of the troubled nodes; and
determining optimum inspection conditions associated with the inspection plan based at least in part on the dynamic network condition data.

9. A method implemented in one or more control nodes of a communication network, comprising:
receiving, via the one or more control nodes, operational information of a plurality of nodes of the communication network, the operational information including information regarding an indication of troubled nodes, the troubled nodes having a likelihood of failure but have not yet failed;
providing, via the one or more control nodes, a restoration plan based at least in part on the received indication of troubled nodes, wherein the restoration plan is associated with one or more repair data packages and the restoration plan is capable of execution by the troubled nodes to repair the troubled nodes;
receiving, via the one or more control nodes, dynamic network condition data associated with the communication network; and
determining, via the one or more control nodes, optimum delivery conditions associated with the restoration plan based at least in part on the dynamic network condition data.

10. The method of claim 9, wherein the determination of optimum delivery conditions associated with the restoration plan includes adjusting a priority ranking associated with the troubled nodes to organize a sequence of delivery of the one or more repair data packages.

11. The method of claim 9, wherein the dynamic network condition data is based at least in part on one or more of observed hop counts associated with a routing table, observed map delay times, or observed congestion conditions from existing traffic.

12. The method of claim 9, further comprising:
receiving static network condition data associated with the communication network, wherein the static network condition data is based at least in part on a network cost map, and
wherein the determination of optimum delivery conditions associated with the restoration plan is based at least in part on the dynamic network condition data and the static network condition data.

13. The method of claim 9, wherein the dynamic network condition data includes dynamic network condition data regarding a first node supporting an application and a second node redundantly supporting the application; and wherein the determination of optimum delivery conditions associated with the restoration plan includes adjusting a priority ranking associated with the troubled nodes based at least in part on the second node redundantly supporting the application.

14. The method of claim 9, wherein the dynamic network condition data includes dynamic network condition data regarding a buffer status associated with a first node supporting an application; and wherein the determination of optimum delivery conditions associated with the restoration plan includes adjusting a priority ranking associated with the troubled nodes based at least in part on the buffer status associated with the first node supporting the application.

15. A communication network, comprising:
a plurality of nodes configured to communicate with one another; and at least one of the plurality of nodes comprising one or more control nodes, the one or more control nodes configured to:
receive, via the one or more control nodes, operational information of a plurality of nodes of the communication network, the operational information including information regarding an indication of troubled nodes, the troubled nodes having a likelihood of failure but have not yet failed;
determine, via the one or more control nodes, a restoration plan based at least in part on the received indication of troubled nodes, wherein the restoration plan is associated with one or more repair data packages and the restoration plan is capable of execution by the troubled nodes to repair the troubled nodes;
determine, via the one or more control nodes, optimum delivery conditions associated with the restoration plan; and
provide, via the one or more control nodes, at least one of the one or more repair data packages to a select non-troubled node adjacent to a select troubled node prior to failure of the select troubled node, wherein the providing at least one of the one or more repair data packages is based at least in part on the determined optimum delivery conditions.

16. The communication network of claim 15, wherein the determination of optimum delivery conditions associated with the restoration plan includes adjusting a priority ranking associated with the troubled nodes to organize a sequence of delivery of the one or more repair data packages.

17. The communication network of claim 15, wherein the at least one of the plurality of nodes are further configured to:
receive dynamic network condition data associated with the communication network, wherein the dynamic network condition data is based at least in part on one or more of observed hop counts associated with a routing table, observed map delay times, or observed congestion conditions from existing traffic;
receive static network condition data associated with the communication network, wherein the static network condition data is based at least in part on a network cost map, and
wherein the determination of optimum delivery conditions associated with the restoration plan is based at least in part on the dynamic network condition data and the static network condition data.

18. The communication network of claim 17, wherein the dynamic network condition data includes dynamic network condition data regarding a first node supporting an application and a second node redundantly supporting the application; and wherein the determination of optimum delivery conditions associated with the restoration plan includes adjusting a priority ranking associated with the troubled nodes based at least in part on the second node redundantly supporting the application.

19. The communication network of claim 17, wherein the dynamic network condition data includes dynamic network condition data regarding a buffer status associated with a first node supporting an application; and wherein the determination of optimum delivery conditions associated with the restoration plan includes adjusting a priority ranking associated with the troubled nodes based at least in part on the buffer status associated with the first node supporting the application.

20. The communication network of claim 17, wherein the at least one of the plurality of nodes are further configured to:
provide an inspection plan based at least in part on the received indication of troubled nodes, wherein the inspection plan includes a selection of at least a portion of the non-troubled nodes as inspection nodes intended to probe at least a portion of the troubled nodes; and
determine optimum inspection conditions associated with the inspection plan based at least in part on the dynamic network condition data.

21. An article for use with one or more of a plurality of nodes associated with one or more control nodes of a communication network, comprising:
a non-transitory signal bearing medium comprising machine-readable instructions stored thereon, which, when executed by one or more processors, operatively enable a computing device to:
receive, via the one or more control nodes, operational information of a plurality of nodes of the communication network, the operational information including information regarding an indication of troubled nodes, the troubled nodes having a likelihood of failure but have not yet failed;
determine, via the one or more control nodes, a restoration plan based at least in part on the received indication of troubled nodes, wherein the restoration plan is associated with one or more repair data packages and the restoration plan is capable of execution by the troubled nodes to repair the troubled nodes;
determine, via the one or more control nodes, optimum delivery conditions associated with the restoration plan; and
provide, via the one or more control nodes, at least one of the one or more repair data packages to a select non-troubled node adjacent to a select troubled node prior to failure of the select troubled node, wherein the providing at least one of the one or more repair data packages is based at least in part on the determined optimum delivery conditions.

* * * * *